(12) United States Patent
Koishikawa et al.

(10) Patent No.: US 10,308,300 B2
(45) Date of Patent: Jun. 4, 2019

(54) SEAT ATTACHMENT STRUCTURE OF SADDLE RIDING VEHICLE

(71) Applicant: HONDA MOTOR CO., LTD., Tokyo (JP)

(72) Inventors: Takuma Koishikawa, Kumamoto (JP); Toru Sakai, Kikuchi-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 31 days.

(21) Appl. No.: 15/472,531

(22) Filed: Mar. 29, 2017

(65) Prior Publication Data

US 2017/0282987 A1 Oct. 5, 2017

(30) Foreign Application Priority Data

Mar. 31, 2016 (JP) .................................. 2016-073408

(51) Int. Cl.
*B62J 1/02* (2006.01)
*B62J 1/04* (2006.01)
*B62J 1/08* (2006.01)

(52) U.S. Cl.
CPC . *B62J 1/08* (2013.01); *B62J 1/02* (2013.01); *B62J 1/04* (2013.01); *B62K 2201/02* (2013.01)

(58) Field of Classification Search
CPC ......... B62J 1/02; B62J 1/04; B62J 1/08; B62J 1/12; B62J 2700/634
USPC ..................................................... 297/195.1
See application file for complete search history.

(56) References Cited

U.S. PATENT DOCUMENTS

| 5,040,632 | A | * | 8/1991 | Fujii | B62K 19/46 180/219 |
| 6,247,549 | B1 | * | 6/2001 | Krams | B62J 1/10 180/219 |
| 7,185,867 | B2 | * | 3/2007 | Hill | B60N 2/502 248/406.2 |

(Continued)

FOREIGN PATENT DOCUMENTS

| CA | 2944812 A1 * | 4/2017 | ............... B62J 1/08 |
| CA | 2962250 A1 * | 9/2017 | ............... B62J 1/08 |

(Continued)

OTHER PUBLICATIONS

Extended European Search Report, dated Sep. 8, 2017, for European Application No. 17160776.5.

(Continued)

*Primary Examiner* — Ryan D Kwiecinski
(74) *Attorney, Agent, or Firm* — Birch, Stewart, Kolasch & Birch, LLP (57) ABSTRACT

A seat attachment structure of a saddle riding vehicle in which, in a state a first end side of a seat, on which an occupant sits, in a forward/rearward direction of a vehicle body is locked to the vehicle body, a second end side of the seat in the forward/rearward direction of the vehicle body is coupled to the vehicle body, the seat attachment structure of the saddle riding vehicle includes a seat attachment member configured to couple a second end side of a seat to a vehicle body, and the seat attachment member includes vehicle body-side connecting sections swingably attached to the vehicle body while having an axis extending along a vehicle width direction as a swing axis, and seat fixing sections to which the second end side of the seat is attached.

11 Claims, 9 Drawing Sheets

(56) References Cited

U.S. PATENT DOCUMENTS

| | | | |
|---|---|---|---|
| 2007/0257535 A1* | 11/2007 | Yasuda | B60N 2/40 |
| | | | 297/311 |
| 2014/0076948 A1* | 3/2014 | Tsutsui | B62J 11/005 |
| | | | 224/458 |
| 2015/0321717 A1 | 11/2015 | Ito | |
| 2016/0101819 A1* | 4/2016 | Iwata | B62J 1/14 |
| | | | 280/202 |
| 2017/0282749 A1* | 10/2017 | Yamamoto | H01M 8/04208 |
| 2018/0141604 A1* | 5/2018 | Uchiumi | B62J 1/065 |

FOREIGN PATENT DOCUMENTS

| | | | | |
|---|---|---|---|---|
| EP | 1447313 A2 | | 8/2004 | |
| EP | 2921380 A1 * | | 9/2015 | B60N 2/002 |
| JP | 58-115478 U | | 8/1983 | |
| JP | 7-246966 A | | 9/1995 | |
| JP | 11-263254 A | | 9/1999 | |
| JP | 2000-211569 A | | 8/2000 | |
| JP | 2003-261082 A | | 9/2003 | |
| JP | 2004-243822 A | | 9/2004 | |
| JP | 2009-262845 A | | 11/2009 | |
| JP | 2011057069 A * | | 3/2011 | B62J 1/12 |
| JP | 2012-76552 A | | 4/2012 | |
| JP | 2014061751 A * | | 4/2014 | B62J 1/12 |
| JP | 2015033899 A * | | 2/2015 | B60N 2/02 |
| RU | 2097247 C1 * | | 11/1997 | B62J 1/08 |
| WO | WO 2014/087554 A1 | | 6/2014 | |

OTHER PUBLICATIONS

Japanese Office Action, dated Jul. 25, 2017, for Japanese Application No. 2016-073408, with English translation.

* cited by examiner

SEAT ATTACHMENT STRUCTURE OF SADDLE RIDING VEHICLE

CROSS-REFERENCE TO RELATED APPLICATION

Priority is claimed on Japanese Patent Application No. 2016-073408, filed Mar. 31, 2016, the contents of which are incorporated herein by reference.

BACKGROUND

Field of the Invention

The present invention relates to a seat attachment structure of a saddle riding vehicle such as a motorcycle or the like.

Description of Related Art

As an attachment structure of an occupant-seating seat of a saddle riding vehicle, a structure in which one end side in a forward/rearward direction is locked to a portion of a vehicle body by a hook or the like and the other end side in the forward/rearward direction is coupled to a different portion of the vehicle body through bolt fastening or the like is known (for example, see Japanese Unexamined Patent Application, First Publication No. 2009-262845).

In the seat attachment structure disclosed in Japanese Unexamined Patent Application, First Publication No. 2009-262845, a hook formed at a front section of a front seat is locked to a locking tool installed at a main frame of the vehicle body, and an arm section protruding from a rear section of the front seat is fitted into a protrusion protruding from a cross member of the vehicle body. Then, a rear seat locked while assembled to the vehicle body is disposed at the rear section of the front seat, and a pressing section protruding from the front section of the rear seat is formed to restrict upward displacement of the arm section of the rear section of the front seat.

SUMMARY

However, in the seat attachment structure disclosed in Japanese Unexamined Patent Application, First Publication No. 2009-262845, in a state in which a front section side of the front seat is locked to the locking tool by the hook, the arm section of the rear section of the front seat is fitted into the protrusion fixed to the cross member of the vehicle body through welding. For this reason, for example, when a machining error or an attachment error occurs in the hook of the front seat or the locking tool configured to lock the hook, when a formation error occurs in a bottom plate of the seat, or the like, it becomes difficult to fit the arm section of the rear section of the front seat into the protrusion on the cross member.

An aspect of the present invention is directed to provide a seat attachment structure of a saddle riding vehicle capable of increasing attachment workability of a seat.

A seat attachment structure of a saddle riding vehicle according to the present invention employs the following configurations in order to solve the above-mentioned problems.

(1) There is provided a seat attachment structure of a saddle riding vehicle according to an aspect of the present invention, in which, in a state a first end side of a seat, on which an occupant sits, in a forward/rearward direction of a vehicle body is locked to the vehicle body, a second end side of the seat in the forward/rearward direction of the vehicle body is coupled to the vehicle body, the seat attachment structure of the saddle riding vehicle including a seat attachment member interposed between the second end side of the seat and the vehicle body and configured to couple the second end side of the seat to the vehicle body, wherein the seat attachment member includes a vehicle body-side connecting section swingably attached to the vehicle body while having an axis extending along a vehicle width direction as a swing axis; and a seat fixing section disposed at a position separated from the vehicle body-side connecting section in the forward/rearward direction of the vehicle body and to which the second end side of the seat is attached.

According to the above-mentioned configuration, the seat attachment member is swingably attached to the vehicle body by the vehicle body-side connecting section. In a state in which one end side (first end side) of the vehicle body in the forward/rearward direction is locked to the vehicle body, the other end side (second end side) of the vehicle body in the forward/rearward direction is attached to the seat fixing section of the seat attachment member. Here, since the seat attachment member is swingable with respect to the vehicle body via the vehicle body-side connecting section, the seat attachment member can adjust an inclination attitude or position with respect to the vehicle body when the other end side (second end side) of the seat in the forward/rearward direction of the vehicle body is attached to the seat fixing section. For this reason, even when a machining error or a formation error occurs in each portion of the component, the seat can be easily attached to the vehicle body.

(2) In the seat attachment structure of the saddle riding vehicle of the above-mentioned (1), a swing restriction section configured to restrict a swing range of the seat attachment member may be installed at the vehicle body.

In this case, the swing range of the seat attachment member is restricted by the swing restriction section within an appropriate range, and excessive positional deviation of the seat attachment member can be suppressed.

(3) In the seat attachment structure of the saddle riding vehicle of the above-mentioned (2), an elastic member may be provided at least at one of the swing restriction section and a portion of the seat attachment member opposite to the swing restriction section.

In this case, a reaction according to a swing amount of the seat attachment member can be obtained by the first elastic member, and when attachment work of the seat is terminated, the seat attachment member can be returned to an appropriate position. In addition, since the seat attachment member abuts the swing restriction section of the vehicle body side via the first elastic member, occurrence of abutting noise when the seat attachment member is abruptly swung can be suppressed by the first elastic member.

(4) In the seat attachment structure of the saddle riding vehicle of the above-mentioned (2) or (3), the swing restriction section may include a first swing restriction section configured to restrict pivotal movement in one direction of the seat attachment member about the vehicle body-side connecting section, and a second swing restriction section configured to restrict pivotal movement in the other direction of the seat attachment member about the vehicle body-side connecting section.

In this case, even when the seat attachment member is pivoted in any one direction about the vehicle body-side connecting section, excessive swinging of the seat attachment member can be reliably restricted by any one of the first swing restriction section and the second swing restriction section.

(5) In the seat attachment structure of the saddle riding vehicle of the above-mentioned (4), the first swing restriction section and the second swing restriction section may be arranged to include a receiving surface that are oriented in different directions around an axis extending in the vehicle width direction with each other and that have different angles with each other.

In this case, even when the seat attachment member is translated in any one direction, displacement of the seat attachment member can be efficiently restricted by any one of the first swing restriction section and the second swing restriction section.

(6) In the seat attachment structure of the saddle riding vehicle according to any one of the above-mentioned (1) to (5), the vehicle body-side connecting sections of the seat attachment member may be attached to the vehicle body via a second elastic member, and a notch may be formed in a pressure welding surface of the second elastic member.

In this case, as the size, the number, or the like, of the notches of the second elastic member is varied, reaction properties of the second elastic member can be easily set and varied.

(7) In the seat attachment structure of the saddle riding vehicle of the above-mentioned (6), the plurality of vehicle body-side connecting sections may be formed on a same straight line in the vehicle width direction, and the notches formed in the second elastic members of the vehicle body-side connecting sections may be formed in the same shape.

In this case, reaction properties of the second elastic members of the plurality of vehicle body-side connecting sections formed on the same straight line in the vehicle width direction can be uniformly and accurately set.

According to the aspect of the present invention, since the seat attachment member having the vehicle body-side connecting section swingably attached to the vehicle body and the seat fixing section to which the other end side of the seat is attached is provided, in a state in which one end side of the seat in the forward/rearward direction is locked to the vehicle body, the other end side of the seat in the forward/rearward direction is attached to the seat fixing section of the seat attachment member while the inclination attitude or position of the seat attachment member is finely adjusted. Accordingly, according to the aspect of the present invention, attachment workability of the seat can be improved.

DESCRIPTION OF EMBODIMENTS

Hereinafter, an embodiment of the present invention will be described based on the accompanying drawings. Further, directions of forward, rearward, left, right, and so on described below are the same as directions of a vehicle described below unless the context clearly indicates otherwise.

In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

Figure 1:
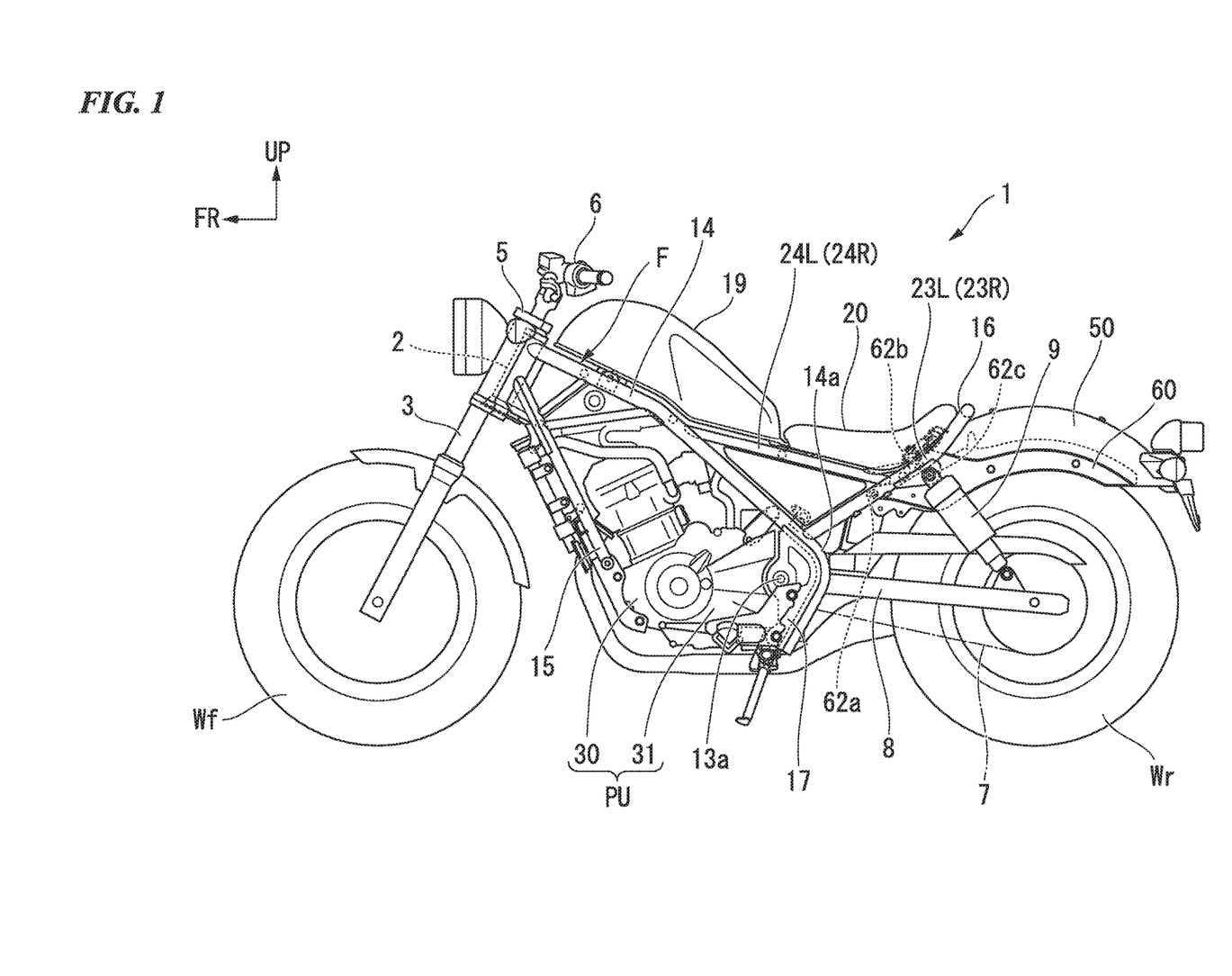
FIG. 1 is a side view of a saddle riding vehicle according to an embodiment of the present invention.

FIG. 1 is a view showing a left side-surface of a saddle riding vehicle according to the embodiment. The saddle riding vehicle according to the embodiment is a so-called cruiser type motorcycle 1 in which a vehicle height is decreased and a forward/rearward length is increased. A front wheel Wf of the motorcycle 1 is rotatably supported by lower end portions of a pair of left and right front forks 3. The left and right front forks 3 are supported by a head pipe 2 of a front end portion of a vehicle body frame F via upper and lower bridge members 5 and a steering stem (not shown). A bar type steering handle 6 is attached to the upper bridge member 5.

A rear wheel Wr of the motorcycle 1 is supported by rear end portions of a swing arm 8. A front end portion of the swing arm 8 is vertically swingably supported by a pivot section 13a of the vehicle body frame F. The rear wheel Wr is linked to an engine 30 serving as a motor of the motorcycle 1 via, for example, a power train or the like constituted by a chain 7. Lower end portions of rear cushions 9 serving as a suspension component of the rear wheel Wr side are connected to the swing arm 8 in the vicinity of a rear wheel support section.

Figure 2:
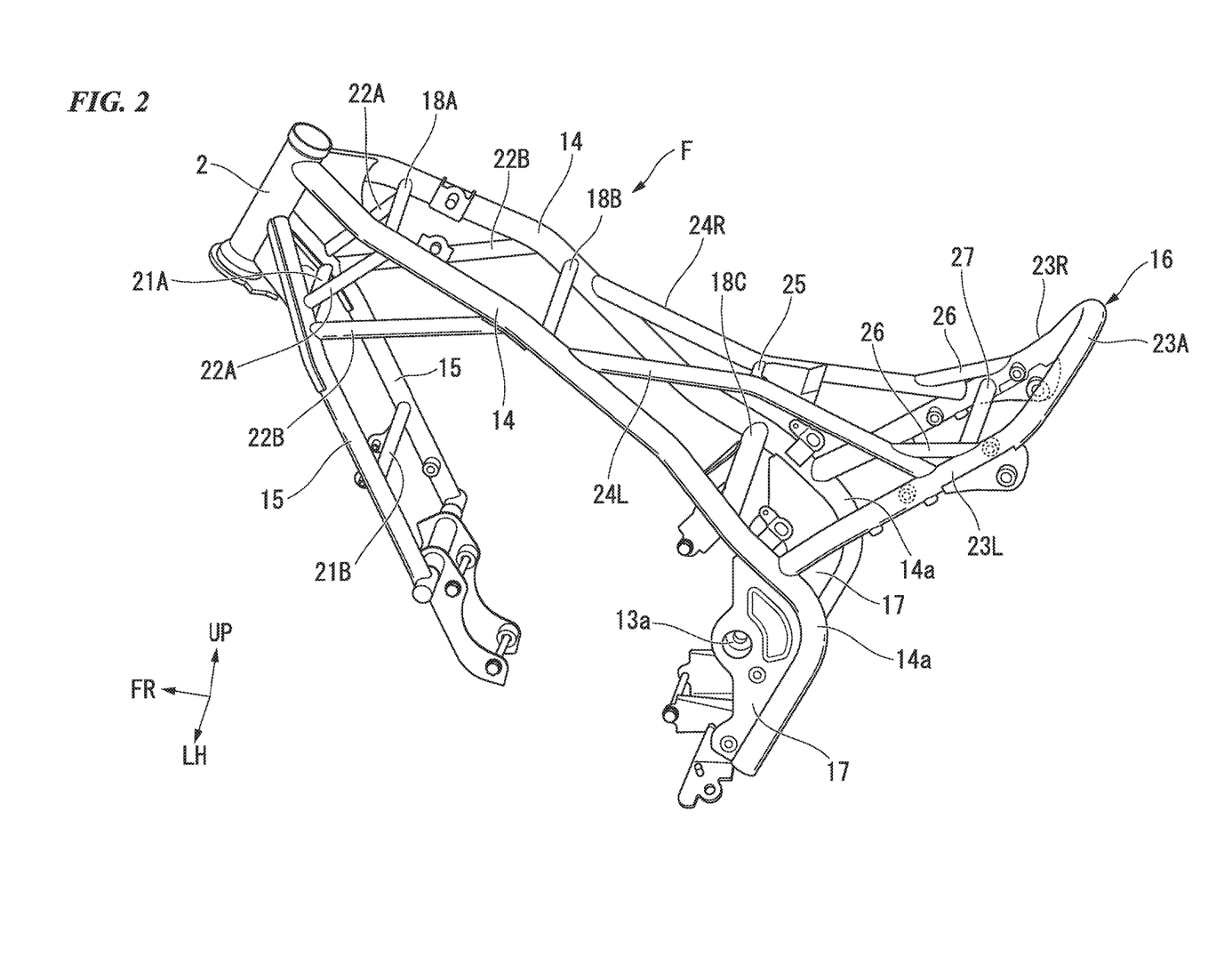
FIG. 2 is a perspective view showing a vehicle body frame of the saddle riding vehicle according to the embodiment of the present invention.
Figure 3:
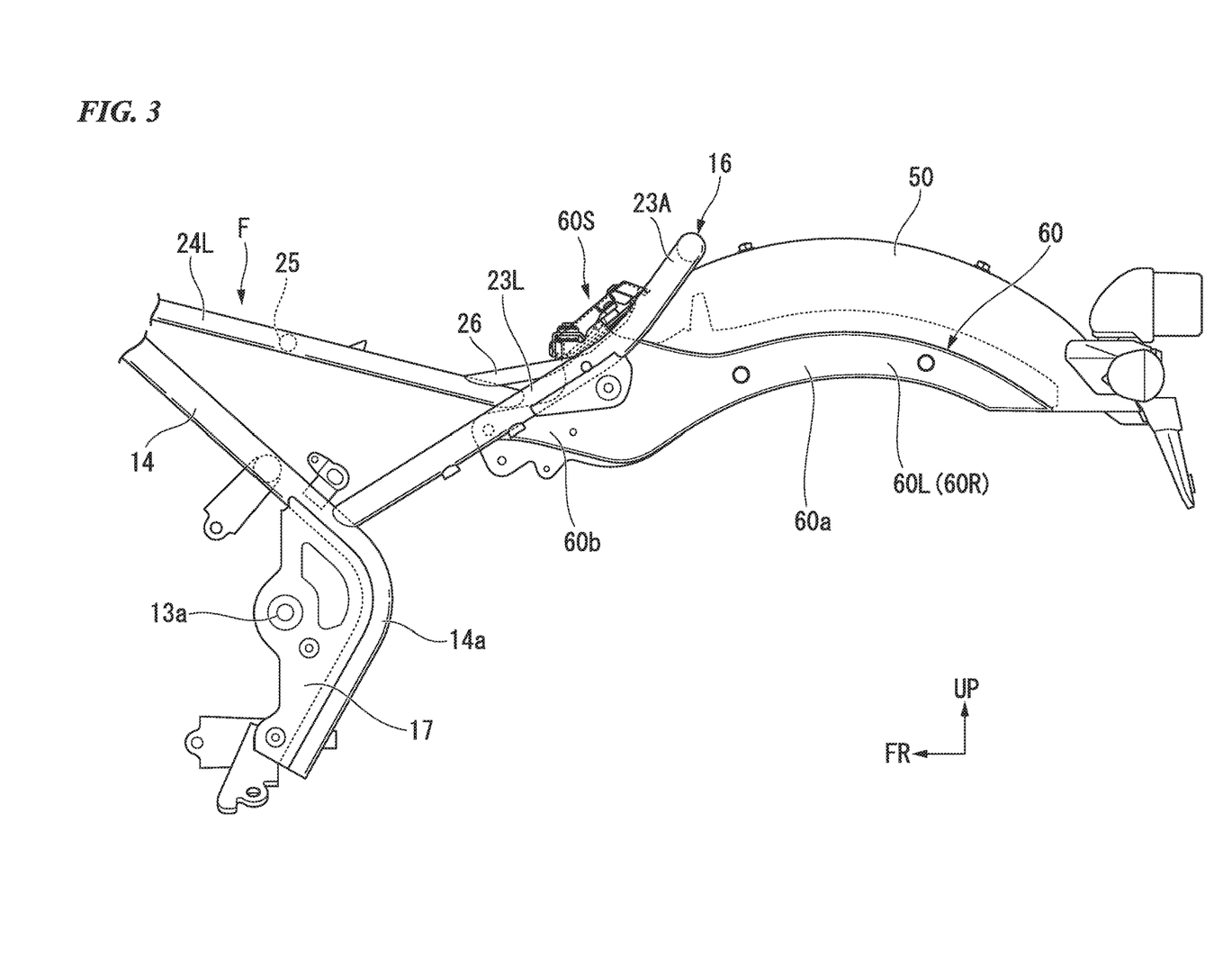
FIG. 3 is a side view showing the vehicle body frame of the saddle riding vehicle according to the embodiment of the present invention.

FIGS. 2 and 3 are views showing a major part of the vehicle body frame F of the motorcycle 1.

As shown in FIGS. 2 and 3, the vehicle body frame F includes the head pipe 2 disposed at a front end portion of the vehicle body frame F and configured to support a steering stem (not shown), a pair of left and right main frames 14 branched off from an upper rear side of the head pipe 2 toward left and right sides, extending rearward and downward when seen in a side view and then changing directions at rear curved sections 14a to extend downward, a pair of left and right down frames 15 branched off from a lower rear side of the head pipe 2 toward left and right sides and extending rearward and downward to be steeply inclined more than the main frames 14 when seen in a side view, a rear frame 16 connected to rear upper surface sides of the left and right main frames 14, and a rear fender frame 60 having a front region connected to the rear frame 16 and configured to support a rear fender 50 that covers the rear wheel Wr from above. Further, in FIG. 2, the rear fender frame 60 is not shown.

Both of the left and right main frames 14 and the down frames 15 are formed by bending round steel tubes. The left and right main frames 14 are curved toward the outside in the vehicle width direction from joining sections at front end portions joining with the head pipe 2 such that once a separation width therebetween is a constant width once, the separation width therebetween is narrowed toward the vicinity of the rear curved sections 14a, and then the separation width is widened again downward from the vicinity of the rear curved sections 14a. The left and right main frames 14 are connected by a plurality of cross pipes 18A, 18B and 18C. A front section of a fuel tank 19 is disposed over front section sides of the left and right main frames 14, and a rear section of the fuel tank 19 and an occupant-seating seat 20 are disposed over a region in which the separation width is small of rear section sides of the left and right main frames 14 via the rear frame 16.

In addition, a pivot plate 17 is attached to the rear curved sections 14a of the left and right main frames 14 and lower regions thereof. The pivot section 13a configured to support a front end portion of the swing arm 8 is attached to the pivot plate 17.

The left and right down frames 15 are connected to each other by a plurality of cross pipes 21A and 21B, and upper regions of the left and right down frames 15 are connected to front regions of the left and right main frames 14 by cassette frames 22A and 22B.

A power unit PU in which the engine 30 and a gear box 31 are integrated is disposed at a region surrounded by the down frames 15 and the main frames 14. The power unit PU is attached to the down frames 15 and the main frames 14 and constitutes a portion of the vehicle body frame F.

The rear frame 16 has a pair of left and right seat frame sections 23L and 23R extending from upper surfaces of the left and right main frames 14 in the vicinity of the rear curved sections 14a toward rear upper sides (extending toward rear positions of a seat 20), and a connecting section 23A curved in substantially a U shape and configured to connect rear sections of the left and right seat frame sections 23L and 23R. In the case of the embodiment, the left and right seat frame sections 23L and 23R and the connecting section 23A are integrally formed by bending a round steel tube. However, the left and right seat frame sections 23L and 23R or the connecting section 23A may be constituted by a separate member.

The rear frame 16 further has a pair of left and right seat sub-frame sections 24L and 24R extending from substantially intermediate positions in the extension direction of the left and right seat frame sections 23L and 23R toward front upper sides and having front end portions connected to the left and right main frames 14.

In addition, while the left and right seat sub-frame sections 24L and 24R are formed in a substantially linear shape when seen in a side view, the left and right seat sub-frame sections 24L and 24R are bent inward in the vehicle width direction such that central regions in the extension direction approach each other when seen in a plan view. Portions close to sections of the left and right seat sub-frame sections 24L and 24R that are closest to each other are connected to each other by a cross pipe 25. In addition, the rear regions of the seat sub-frame sections 24L and 24R and the seat frame sections 23L and 23R are reinforced by cassette frames 26 extending substantially horizontally.

The left and right seat frame sections 23L and 23R are connected to each other by a cross pipe 27 at positions closer to an area above the rear sections than the connecting sections to the left and right seat sub-frame sections 24L and 24R.

As shown in FIG. 3, the rear fender frame 60 includes a pair of side frame sections 60L and 60R disposed at both of left and right sides in the vehicle width direction, and a center plate (not shown) curved to connect the rear region of the pair of side frame sections 60L and 60R at an upper side thereof. The left and right side frame sections 60L and 60R have arc regions 60a having arc shapes substantially along an upper section shape of the rear wheel Wr, and front regions 60b extending forward from front sections of the arc regions 60a, when seen in a side view. The front regions 60b of the left and right side frame sections 60L and 60R are disposed inside in the vehicle width direction of the left and right seat frame sections 23L and 23R and fastened and fixed to the corresponding left and right seat frame sections 23L and 23R at a plurality of places. The rear fender 50 is attached to an upper surface side of the center plate (not shown).

Figure 4:
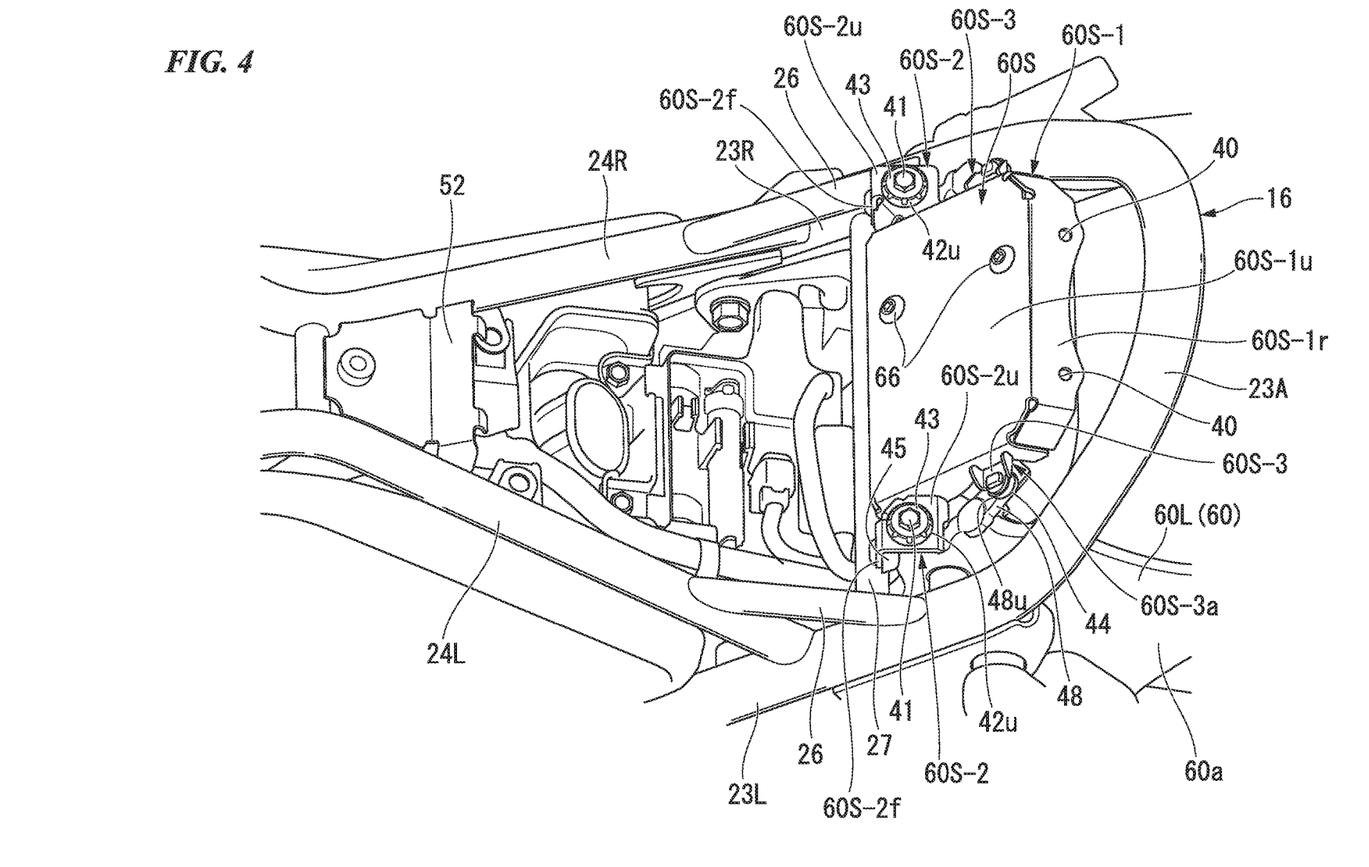
FIG. 4 is a perspective view of the saddle riding vehicle according to the embodiment of the present invention.
Figure 5:
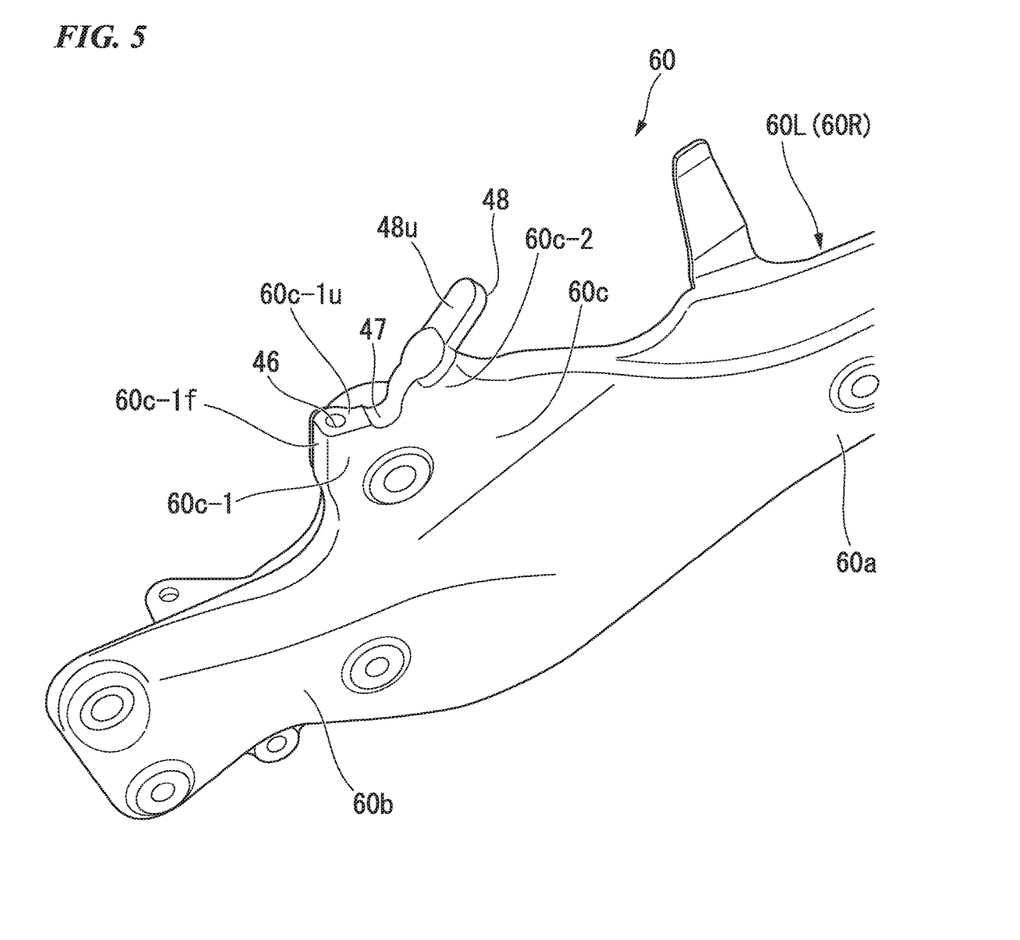
FIG. 5 is a perspective view showing a portion of a rear fender frame of the saddle riding vehicle according to the embodiment of the present invention.

FIG. 4 is a view showing the vicinity of the connecting section of the rear frame 16 and the rear fender frame 60 from above the left front section of the vehicle body. In addition, FIG. 5 is a view showing a front side region of the left side frame section 60L of the rear fender frame 60 from above the left front section of the vehicle body.

Swelling regions 60c swelling upward with respect to the front edge portions of the arc regions 60a and the front regions 60b are formed between the front regions 60b and the arc regions 60a of the left and right side frame sections 60L and 60R. A seat attachment member 60S, a major part of which is formed of a metal such as an aluminum alloy or the like, bridges the swelling regions 60c of the left and right side frame sections 60L and 60R.

Figure 6:
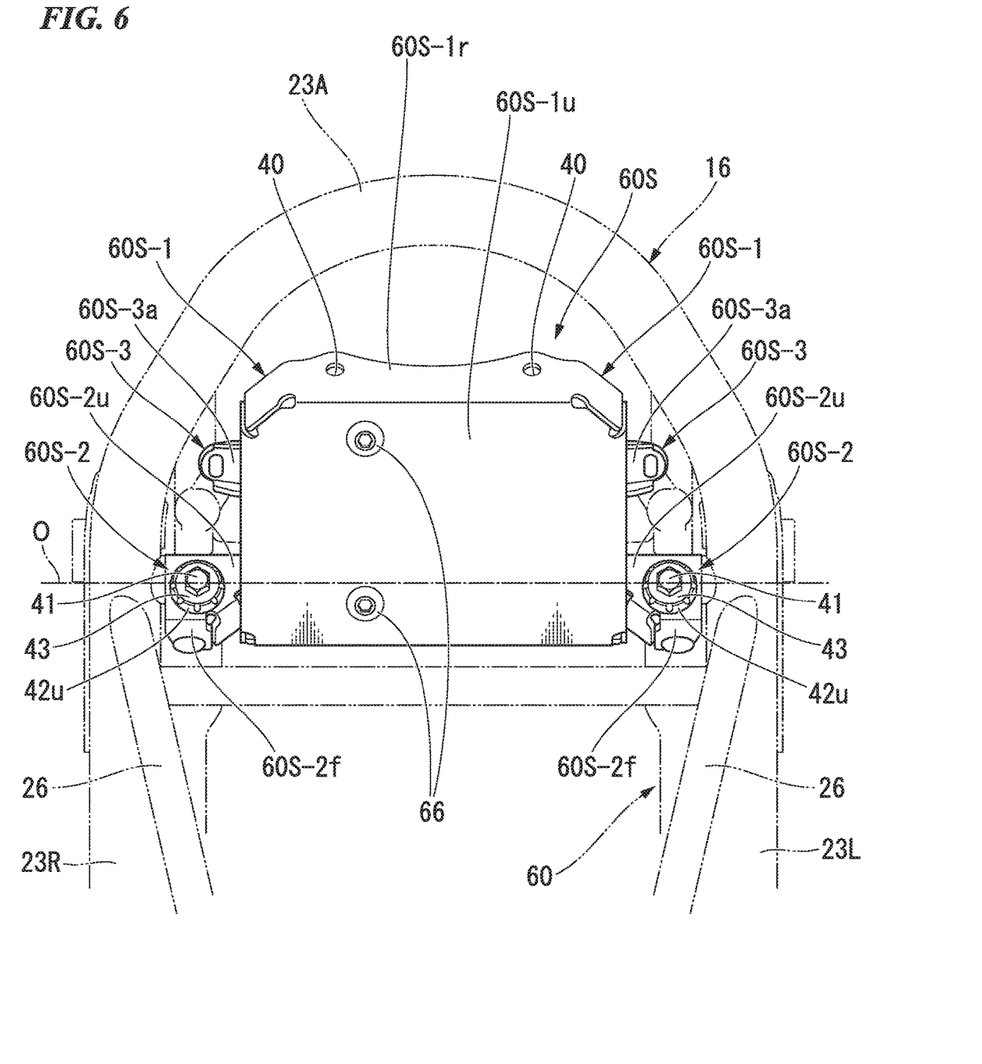
FIG. 6 is a plan view of a seat attachment member according to the embodiment of the present invention.
Figure 7:
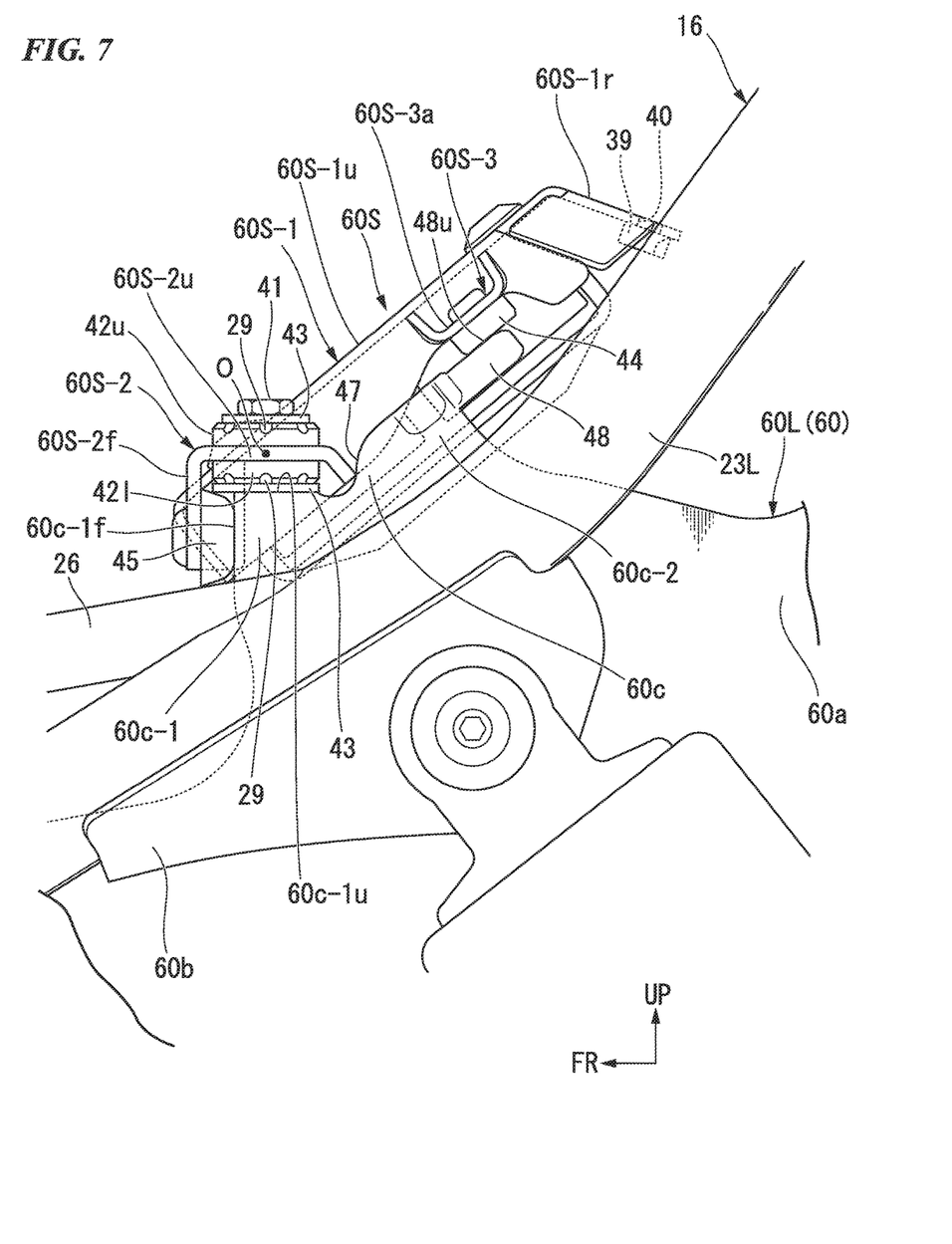
FIG. 7 is a side view of a seat attachment section of the saddle riding vehicle according to the embodiment of the present invention.

FIG. 6 is a view showing the seat attachment member 60S when seen from above the vehicle, and FIG. 7 is a side view of the motorcycle 1 in which the seat attachment member 60S and the vicinity of the attachment section thereof are enlarged.

As shown in FIGS. 6 and 7, the seat attachment member 60S has a main body section 60S-1 formed in substantially a shallow box shape, a lower side of which is open, front protrusion sections 60S-2 fixed to regions of the main body section 60S-1 close to front end portions of left and right sidewalls through welding, and rear protrusion sections 60S-3 fixed to regions of the main body section 60S-1 close to rear end portions of the left and right sidewalls.

A regulator (regulator/rectifier) (not shown) is fastened and fixed to a lower surface side of an upper flat wall 60S-1u of the main body section 60S-1 by a bolt 66. The regulator converts alternating current power generated by a generator into direct current at a voltage of a specified voltage or less.

In addition, a pair of fastening holes 40 configured to fasten and fix a lower surface of a rear section side of the seat 20 are formed in a rear wall 60S-1r of the main body section 60S-1. The pair of fastening holes 40 are formed at positions separated in the vehicle width direction of the rear wall 60S-1r. Weld nuts 39 (see FIG. 7) are attached to back surface sides of the fastening holes 40 of the rear wall 60S-1r. In the embodiment, the fastening holes 40 of the rear wall 60S-1r and the weld nuts 39 constitute a seat fixing section to which the rear section of the occupant-seating seat 20 is fixed.

Further, the seat fixing section constituted by the fastening holes 40 and the weld nuts 39 may be formed on another portion, for example, the upper wall 60S-1u, as long as they are disposed at positions separated from the front protrusion section 60S-2 in the forward/rearward direction of the vehicle body without being limited to the rear wall 60S-1r of the main body section 60S-1.

The left and right front protrusion sections 60S-2 of the seat attachment member 60S have substantially horizontal upper walls 60S-2u, and hanging walls 60S-2f extending to be bent downward from front end portions of the upper walls 60S-2u. Insertion holes (not shown) are formed in the upper walls 60S-2u of the front protrusion sections 60S-2, and bolts 41 configured to fix the front protrusion sections 60S-2 to the corresponding left and right side frame sections 60L and 60R are inserted through the insertion holes. Rubber bushes 42*u* and 42*l* serving as second elastic members are disposed to overlap upper surface sides and lower surface sides of the upper walls 60S-2*u* of the front protrusion sections 60S-2. Further, washers 43 overlap an upper surface of the rubber bush 42*u* of an upper side and a lower surface of the rubber bush 42*l* of a lower side, and the upper and lower rubber bushes 42*u* and 42*l* are fixed to the corresponding left and right side frame sections 60L and 60R by the bolts 41 while the upper walls 60S-2*u* of the front protrusion sections 60S-2 are sandwiched therebetween.

In the seat attachment member 60S, portions of the upper walls 60S-2*u* of the left and right front protrusion sections 60S-2 are swingably attached to the corresponding left and right side frame sections 60L and 60R via the rubber bushes 42*u* and 42*l*. Specifically, shaft center sections of the upper and lower rubber bushes 42*u* and 42*l* are fixed to the corresponding side frame sections 60L and 60R by the bolts 41, and outer circumferential edge portions of the upper and lower rubber bushes 42*u* and 42*l* are pressure-welded to upper and lower surfaces of the upper walls 60S-2*u* of the front protrusion sections 60S-2 and the washers 43. Accordingly, the seat attachment member 60S receive initial loads of the upper and lower rubber bushes 42*u* and 42*l* to be maintained at a constant position and a constant attitude, and when an external force is applied in this state, fine displacement is allowed due to elastic deformation of the rubber bushes 42*u* and 42*l*.

The left and right front protrusion sections 60S-2 of the seat attachment member 60S are formed at left and right symmetrical positions of the main body section 60S-1. Accordingly, portions of the upper walls 60S-2*u* of the left and right front protrusion sections 60S-2 are attached to the vehicle body (the side frame sections 60L and 60R) together with the upper and lower rubber bushes 42*u* and 42*l* in a state so as to be swingable in a gravity direction using an axis O in the vehicle width direction as a swing axis.

In the case of the embodiment, the upper walls 60S-2*u* of the left and right front protrusion sections 60S-2 and the upper and lower rubber bushes 42*u* and 42*l* constitute a vehicle body-side connecting section in the seat attachment member 60S.

In addition, in the case of the embodiment, the seat attachment member 60S is inclined upward toward a rear side of the vehicle body such that the upper walls 60S-1*u* of the main body section 60S-1 are disposed substantially along inclinations of the side frame sections 60L and 60R in a state in which the left and right front protrusion sections 60S-2 are attached to the left and right side frame sections 60L and 60R via the rubber bushes 42*u* and 42*l* as shown in FIG. 7.

The left and right rear protrusion sections 60S-3 of the seat attachment member 60S have restriction walls 60S-3*a* inclined upward toward a rear side of the vehicle body substantially along the upper walls 60S-1*u* of the main body section 60S-1. Rubber shock-absorbing members 44 (first elastic members) are attached to the restriction walls 60S-3*a*. The rubber shock-absorbing members 44 have substantially columnar load receiving sections protruding downward the restriction walls 60S-3*a*.

In addition, similarly, rubber shock-absorbing members 45 (second elastic members) are also attached to the hanging walls 60S-2*f* of the left and right front protrusion sections 60S-2 of the seat attachment member 60S. The rubber shock-absorbing members 45 have substantially spherical load receiving sections protruding toward rear sides of the hanging walls 60S-2*f*.

Here, as shown in FIGS. 5 and 7, the swelling regions 60*c* of the side frame sections 60L and 60R have projections 60*c*-1 with front surfaces 60*c*-1*f* standing in the vertical direction and upper surfaces 60*c*-1*u* extending substantially horizontally from upper ends of the front surfaces 60*c*-1*f* toward a rear side of the vehicle body, and the seat attachment member 60S is attached to the upper surfaces 60*c*-1*u* of the projections 60*c*-1. Specifically, as shown in FIG. 5, fastening holes 46 are formed in the upper surfaces 60*c*-1*u* of the projections 60*c*-1, and tip portions of the bolts 41 passing through the front protrusion sections 60S-2 of the seat attachment member 60S and the rubber bushes 42*u* and 42*l* are fastened and fixed to the fastening holes 46. The seat attachment member 60S is attached to the front protrusion sections 60S-2 of the seat attachment member 60S in a state in which the washer 43 disposed at a lower surface side of the rubber bush 42*l* abuts the upper surface 60*c*-1*u* of the projection 60*c*-1.

In addition, the rubber shock-absorbing members 45 attached to the hanging walls 60S-2*f* of the front protrusion sections 60S-2 of the seat attachment member 60S abut the front surfaces 60*c*-1*f* of the projections 60*c*-1. The hanging walls 60S-2*f* restrict excessive pivotal movement of the seat attachment member 60S in one direction about the portions of the rubber bushes 42*u* and 42*l* as a center (a pivot support point) by causing the hanging walls 60S-2*f* to abut the front surfaces 60*c*-1*f* of the projections 60*c*-1 via the rubber shock-absorbing members 45. The front surfaces 60*c*-1*f* of the projections 60*c*-1 constitute a swing restriction section (a first swing restriction section, a receiving surface) configured to restrict a swing range of the seat attachment member 60S.

In addition, the swelling regions 60*c* of the side frame sections 60L and 60R include recessed sections 47 adjacent to rear sides of the projections 60*c*-1, and substantially triangular raised sections 60*c*-2 adjacent to rear sides of the recessed sections 47 when seen in a side view. Extension walls 48 extending toward an upper side of the rear section protrude from the raised sections 60*c*-2. Upper surfaces 48*u* of the extension walls 48 are flatly formed, and the rubber shock-absorbing members 44 attached to the rear protrusion sections 60S-3 of the seat attachment member 60S abut the upper surfaces 48*u*. The restriction wall 60S-3*a* restricts excessive pivotal movement in the other direction about portions of the rubber bushes 42*u* and 42*l* of the seat attachment member 60S (using a pivot support point) by causing the restriction wall 60S-3*a* to abut the upper surfaces 48*u* of the extension walls 48 via the rubber shock-absorbing members 44. The upper surfaces 48*u* of the restriction walls 60S-3*a* constitute a swing restriction section (a second swing restriction section, a receiving surface) configured to restrict a swing range of the seat attachment member 60S.

Further, while the rubber shock-absorbing members 44 are attached to the restriction walls 60S-3*a* of the rear protrusion sections 60S-3 in the embodiment, the rubber shock-absorbing members 44 may be attached to the vehicle body side (for example, the upper surfaces 48*u* of the extension walls 48). Similarly, while the rubber shock-absorbing members 45 are attached to the hanging walls 60S-2*f* of the front protrusion sections 60S-2 in the embodiment, the rubber shock-absorbing members 45 may be attached to the vehicle body side (for example, the front surfaces 60c-1f of the projections 60c-1 of the side frame sections 60L and 60R).

Figure 8:
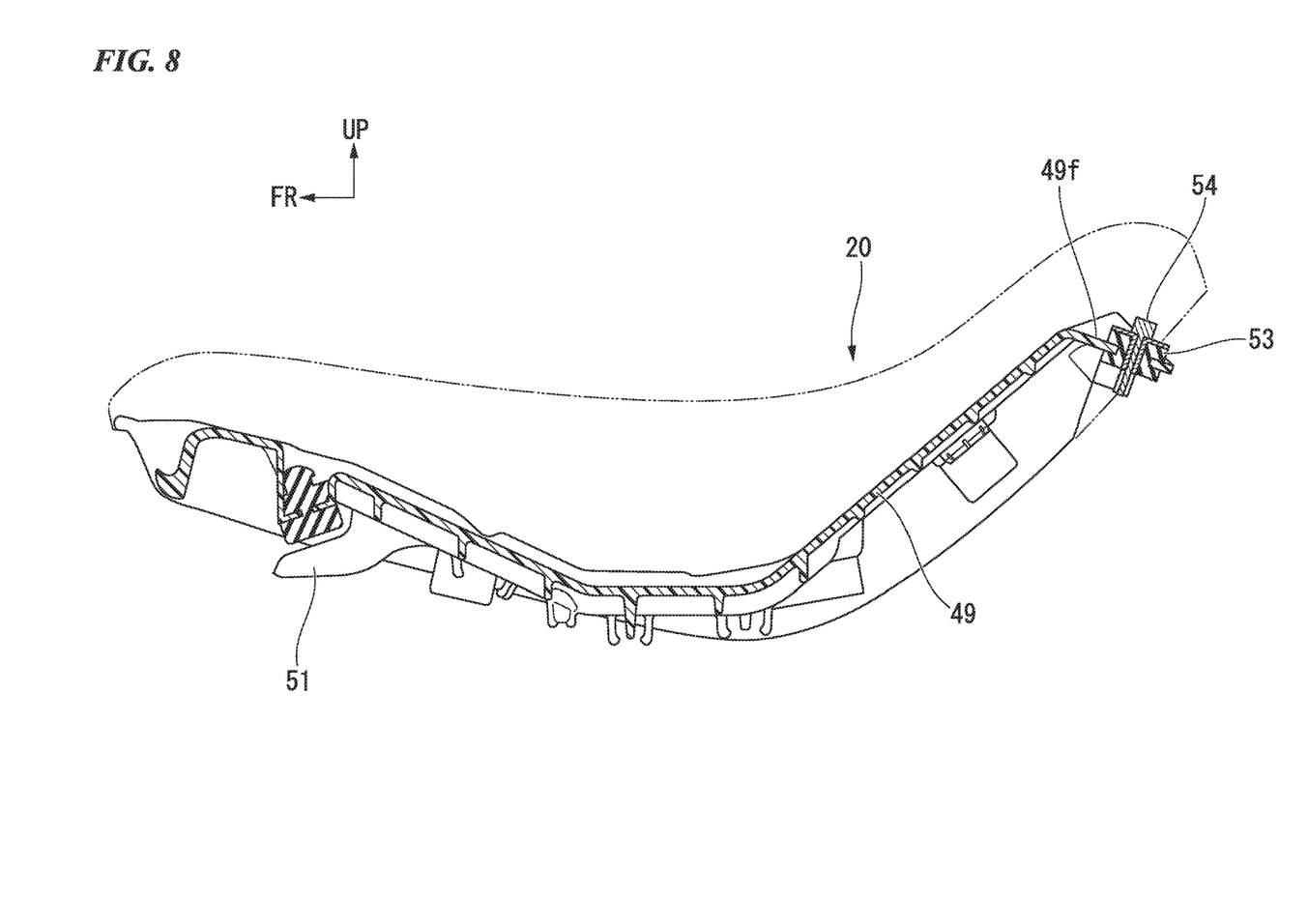
FIG. 8 is a longitudinal cross-sectional view of a seat according to the embodiment of the present invention.

FIG. 8 is a view showing a longitudinal cross section in which a bottom section of the occupant-seating seat 20 is cut substantially along the forward/rearward direction of the vehicle body.

In the seat 20, a seat frame or a cushion material (not shown) is supported by a bottom plate 49. An engaging hook 51 protruding toward a front side of the vehicle body in substantially an L shape extends from a lower surface of a front section side of the bottom plate 49. As shown in FIG. 4, the engaging hook 51 is inserted into a lower side of a locking plate 52 that bridges the left and right seat sub-frame sections 24L and 24R from a rear side of the vehicle body to be locked by the locking plate 52.

In addition, an attachment flange 49f continuously extends from the rear section of the bottom plate 49, and a pair of fastening bolts 54 are held at the attachment flange 49f via rubber bushes 53. Shaft sections of the fastening bolts 54 are locked into the fastening holes 40 of the rear walls 60S-1r of the seat attachment member 60S and the weld nuts 39 of the back portion.

Figure 9:
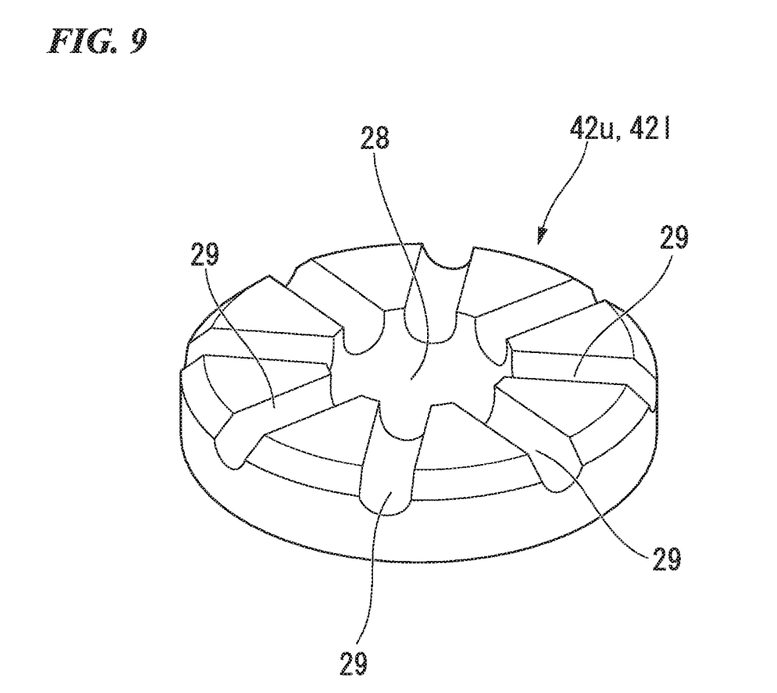
FIG. 9 is a perspective view of a second elastic member according to the embodiment of the present invention.

Incidentally, the upper and lower rubber bushes 42u and 42l configured to swingably support the front protrusion sections 60S-2 of the seat attachment member 60S at the side frame sections 60L and 60R are formed in the shape as shown in FIG. 9. As shown in FIG. 9, the upper and lower rubber bushes 42u and 42l have the same shape, shaft holes 28 into which the shaft sections of the bolts 41 are fitted are formed in the shaft center sections, and a plurality of cutout grooves 29 (notches) are radially formed at one end surface in the axial direction abutting the washers 43. The rubber bushes 42u and 42l attached to the left and right front protrusion sections 60S-2 of the seat attachment member 60S employ the same specifications including shapes (shapes and the number) of the cutout grooves 29.

When the seat 20 is attached to the vehicle body in actuality, the engaging hook 51 at the front section side (one end side of the seat 20, first end side of the seat 20) of the bottom plate 49 of the seat 20 is locked to the locking plate 52 of the vehicle body side, and in this state, the rear section side (another end side of the seat 20, second end side of the seat 20) of the bottom plate 49 is fastened and fixed to the rear section of the main body section 60S-1 of the seat attachment member 60S by the fastening bolts 54. Here, at the time when the shaft sections of the fastening bolts 54 are inserted into the fastening holes 40 corresponding to the rear section of the seat attachment member 60S, the shaft sections of the fastening bolts 54 are inserted into the corresponding fastening holes 40 by appropriately swinging the seat attachment member 60S at the portions of the left and right front protrusion sections 60S-2 while using the rubber bushes 42u and 42l. In this state, the rear section of the seat 20 is fastened and fixed to the vehicle body side via the seat attachment member 60S by fastening the fastening bolts 54.

As described above, the seat attachment structure according to the embodiment includes the seat attachment member 60S including the front protrusion sections 60S-2 that are swingably attached to the side frame sections 60L and 60R of the rear fender frame 60 at the front side of the seat attachment member 60S, and the seat fixing section (the fastening holes 40 and the weld nuts 39) to which the rear end portion of the seat 20 is attached at the rear side of the seat attachment member 60S. For this reason, in a state in which the engaging hook 51 of the front section side of the seat 20 is locked to the locking plate 52 at the vehicle body side, the rear end portion side of the seat 20 can be easily fastened and fixed to the rear walls 60S-1r of the main body section 60S-1 of the seat attachment member 60S by the fastening bolts 54 while an inclination attitude or position of the seat attachment member 60S is finely adjusted. Accordingly, as the seat attachment structure according to the embodiment is employed, attachment workability of the seat 20 can be improved.

In addition, in the seat attachment structure according to the embodiment, the front surface 60c-1f of the projection 60c-1 configured to restrict a swing range of the seat attachment member 60S and the upper surface 48u of the extension wall 48 are formed at the vehicle body side (the side frame sections 60L and 60R). For this reason, the swing range of the seat attachment member 60S can be restricted to within an appropriate range, and excessive positional deviation of the seat attachment member 60S can be suppressed. Accordingly, as the structure is employed, attachment workability of the seat 20 can be further improved.

In particular, in the case of the seat attachment structure according to the embodiment, the rubber shock-absorbing members 45 and 44 are attached to the abutting sections between the front protrusion sections 60S-2 of the seat attachment member 60S and the rear protrusion sections 60S-3 of the vehicle body side. For this reason, the reaction according to the swing amount of the seat attachment member 60S can be obtained by the rubber shock-absorbing members 45 and 44, and after attachment of the seat 20 to the rear section is terminated, the seat attachment member 60S can be returned to an appropriate position. Accordingly, as the configuration is employed, an attachment work of the seat 20 can be more easily performed.

In addition, in the case of the seat attachment structure, since the seat attachment member 60S abuts the projections 60c-1 or the extension walls 48 of the vehicle body side via the rubber shock-absorbing members 45 and 44, occurrence of the abutting noise when the seat attachment member 60S is abruptly swung or the like can be suppressed by elasticity of the rubber shock-absorbing members 45 and 44.

In addition, in the seat attachment structure according to the embodiment, the side frame sections 60L and 60R of the vehicle body side have the front surfaces 60c-1f (the first swing restriction section) of the projections 60c-1 configured to restrict pivotal movement of one side around the axis extending in the vehicle width direction of the seat attachment member 60S, and the upper surfaces 48u (the second swing restriction section) of the extension walls 48 configured to restrict pivotal movement of the other side around the axis of the seat attachment member 60S. For this reason, even when the seat attachment member 60S is pivoted in any one direction around the axis, excessive swinging of the seat attachment member 60S can be reliably restricted.

In particular, in the seat attachment structure according to the embodiment, the front surfaces 60c-1f (receiving surfaces) of the projections 60c-1 serving as the first swing restriction section and the upper surfaces 48u (receiving surfaces) of the extension walls 48 serving as the second swing restriction section are disposed in different directions around the axis at different angles. For this reason, even when the seat attachment member 60S is translated in any one direction due to load input such as attachment or the like of the seat 20, displacement of the seat attachment member 60S can be efficiently restricted by either the front surfaces 60c-1f of the projections 60c-1 or the upper surfaces 48u of the extension walls 48.

Further, in the seat attachment structure according to the embodiment, the front protrusion sections 60S-2 of the seat attachment member 60S are attached to the vehicle body (the side frame sections 60L and 60R) via the rubber bushes 42u and 42l, and the cutout grooves 29 are formed in the pressure welding surfaces (for example, the pressure welding surfaces to the washers 43) of the rubber bushes 42u and 42l. For this reason, as the size, the number, and the like, of the cutout grooves 29 of the rubber bushes 42u and 42l are varied, reaction properties of the rubber bushes 42u and 42l can be easily set and varied.

In addition, in the seat attachment structure according to the embodiment, the cutout grooves 29 of the rubber bushes 42u and 42l attached to the left and right front protrusion sections 60S-2 of the seat attachment member 60S are set to the same shape (and the same number). For this reason, reaction properties of the left and right rubber bushes 42u and 42l of the seat attachment member 60S can be uniformly and accurately set.

Further, the present invention is not limited to the embodiment but various design changes may be made without departing from the scope of the present invention. For example, while the front end portion side of the seat 20 is locked to the vehicle body and the rear end portion side of the seat 20 is coupled to the vehicle body via the seat attachment member 60S in the embodiment, the rear end portion side of the seat 20 may be locked to the vehicle body and the front end portion side of the seat 20 may be coupled to the vehicle body via the seat attachment member 60S.

In addition, all vehicles on which a driver rides on the vehicle body are included as the saddle riding vehicle, and in addition to the motorcycle (including a motorized bicycle and a scooter type vehicle), a three-wheeled vehicle of a two-front-wheeled and one-rear-wheeled type or the like may also be included.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A saddle riding vehicle having a seat attachment structure, in which, in a state a first end side of a seat, on which an occupant sits, in a forward/rearward direction of a vehicle body of the saddle riding vehicle is locked to the vehicle body, a second end side of the seat in the forward/rearward direction of the vehicle body is coupled to the vehicle body, comprising:
    a seat attachment member interposed between the second end side of the seat and the vehicle body and configured to couple the second end side of the seat to the vehicle body,
    wherein the seat attachment member includes:
    a vehicle body-side connecting section swingably attached to the vehicle body while having an axis extending along a vehicle width direction as a swing axis; and
    a seat fixing section disposed at a position separated from the vehicle body-side connecting section in the forward/rearward direction of the vehicle body and to which the second end side of the seat is attached,
    wherein the vehicle body-side connecting section is disposed at an inner side of one of a left seat frame and a right seat frame of the saddle riding vehicle in the vehicle width direction, and
    wherein the vehicle body-side connecting section is arranged so as to extend in a vertical direction.

2. The saddle riding vehicle having a seat attachment structure according to claim 1, wherein a swing restriction section configured to restrict a swing range of the seat attachment member is installed at the vehicle body of the saddle riding vehicle.

3. The saddle riding vehicle having a seat attachment structure according to claim 2, wherein a first elastic member is provided at least at one of the swing restriction section and a portion of the seat attachment member opposite to the swing restriction section.

4. The saddle riding vehicle having a seat attachment structure according to claim 2, wherein the swing restriction section includes a first swing restriction section configured to restrict pivotal movement in one direction of the seat attachment member about the vehicle body-side connecting section, and a second swing restriction section configured to restrict pivotal movement in the other direction of the seat attachment member about the vehicle body-side connecting section.

5. The saddle riding vehicle having a seat attachment structure according to claim 4, wherein the first swing restriction section and the second swing restriction section are arranged to include a receiving surface that are oriented in different directions around an axis extending in the vehicle width direction with each other and that have different angles with each other.

6. The saddle riding vehicle having a seat attachment structure according to claim 1, wherein the vehicle body-side connecting section of the seat attachment member is attached to the vehicle body via a second elastic member, and
    a notch is formed in a pressure welding surface of the second elastic member.

7. The saddle riding vehicle having a seat attachment structure according to claim 6, wherein a plurality of vehicle body-side connecting sections are formed on a same straight line in the vehicle width direction, and
    wherein the notch of each vehicle body-side connecting section formed in the second elastic members of each of the vehicle body-side connecting sections is formed in a same shape.

8. The saddle riding vehicle having a seat attachment structure according to claim 1, wherein the vehicle body-side connecting section is disposed at a front side of the seat attachment member in the forward/rearward direction of the vehicle body.

9. A saddle riding vehicle, comprising:
    a left main frame and a right main frame;
    a left seat frame connected to and extending rearwardly from the left main frame and a right seat frame connected to and extending rearwardly from the right main frame;
    a left rear fender frame and a right rear fender frame;
    a seat attachment member extending between the left seat frame and the right seat frame;
    a first front protrusion extending from a right side of the seat attachment portion and a second front protrusion extending from a left side of the seat attachment portion, each front protrusion comprising a top surface and an aperture in the top surface;
    a first fastener extending through the aperture of the first front protrusion;
    a first upper rubber bush contacting a top surface of the first front protrusion;

a first lower rubber bush contacting a lower surface of the first front protrusion;
a second fastener extending through the aperture of the second front protrusion;
a second upper rubber bush contacting a top surface of the second front protrusion; and
a second lower rubber bush contacting a lower surface of the second front protrusion,
wherein the first front protrusion can rotate about an axis perpendicular to a longitudinal axis of the first fastener and the second front protrusion can rotate about an axis perpendicular to a longitudinal axis of the second fastener.

10. The saddle riding vehicle according to claim 9, wherein the first fastener connects to the right rear fender frame and the second fastener connects to the left rear fender frame.

11. The saddle riding vehicle according to claim 9, further comprising a first rear protrusion extending from the right side of the seat attachment portion and a second rear protrusion extending from the left side of the seat attachment portion.

\* \* \* \* \*